US006665744B2

(12) United States Patent
Shimamoto (10) Patent No.: US 6,665,744 B2
(45) Date of Patent: Dec. 16, 2003

(54) UPGRADING DEVICE AND METHOD OF UPGRADING

(75) Inventor: Hidemitsu Shimamoto, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 311 days.

(21) Appl. No.: 09/849,996

(22) Filed: May 8, 2001

(65) Prior Publication Data

US 2002/0053073 A1 May 2, 2002

(30) Foreign Application Priority Data

Oct. 31, 2000 (JP) .................................... P2000-331753

(51) Int. Cl.$^7$ .............................. G06F 11/00; H04N 5/44
(52) U.S. Cl. .............................. 710/15; 710/8; 710/10; 710/16; 710/18; 710/19; 710/62; 710/65
(58) Field of Search .............................. 710/15, 18, 16, 710/19, 8, 10, 62, 65

(56) References Cited

U.S. PATENT DOCUMENTS

| | | | | |
|---|---|---|---|---|
| 5,235,532 A | * | 8/1993 | Sugino | 713/321 |
| 5,554,827 A | * | 9/1996 | Oda | 178/18.02 |
| 5,568,611 A | * | 10/1996 | Khatri et al. | 713/200 |
| 5,940,074 A | | 8/1999 | Britt, Jr. et al. | |
| 6,426,873 B1 | * | 7/2002 | Minase et al. | 361/686 |
| 6,490,132 B1 | * | 12/2002 | Kano et al. | 360/132 |

FOREIGN PATENT DOCUMENTS

JP a10198571 7/1998

* cited by examiner

*Primary Examiner*—Rehama Perveen
(74) *Attorney, Agent, or Firm*—Birch, Stewart, Kolasch & Birch, LLP (57) ABSTRACT

A cover (19) capable of opening/closing movement is attached to an opening of a card insertion part (18). A detector (14) for detecting opening/closing of cover detects whether the cover (19) is in open position or in closed position. After detecting transition of the cover (19) from open position to closed position, the detector (14) for detecting opening/closing of cover outputs a reset signal (64B). After receipt of the signal (64B), a controller (11) restarts a receiver (1). After restarting, the controller (11) determines whether a memory card (2) is connected to a connector (17) on the basis of a detection result (65) from a card detector (15). When it is determined that the memory card (2) is connected to the connector (17), the controller (11) loads a program in the memory card (2) into a RAM (11B). A copy of information (52) in the memory card (2) is made into a flash memory (12) on the basis of the loaded program by the controller (11). It is possible to provide an upgrading device capable of upgrading information in a memory easily without requiring deep background knowledge.

6 Claims, 6 Drawing Sheets

UPGRADING DEVICE AND METHOD OF UPGRADING

BACKGROUND OF THE INVENTION

1. Field of the Invention

The present invention is directed to a device for and method of upgrading information such as a program used by a controller in various types of systems. More particularly, it is directed to a technique for reducing a user's burden during upgrading.

2. Description of the Background Art

While a built-in processor for a specific use has been conventionally mounted to a general television receiver for domestic use, for example, software of this processor is designed not to be upgradable. In contrast, a device for upgrading software may be included in some systems such as a set-top box for receiving digital broadcasting. Further, software can be upgraded through communication using a modem for accounting system and a personal computer (see Japanese Patent Application Laid-Open No. 10-198571 (1998), for example).

However, setup of the above-mentioned upgrading device in the background art has been required to make communication facility available, requiring a user to have knowledge about such setup. Due to this, the upgrading device in the background art has the problem in convenience and simplicity.

Further, if the communication or power supply is disconnected after start-up of upgrading and before completion of the same in the upgrading device in the background art, original software may be destroyed. As a result, a necessity of reinstalling software arises to cause a problem that facilities intrinsic to the device are made unavailable.

This problem may be avoided by providing additional memory (such as flash memory) in advance for storing software to the upgrading device. More particularly, a large number of flash memories are provided in advance to the upgrading device. Software for upgrading is installed in a flash memory other than the memory in which the original software is stored. That is, the original software can be prevented from being destroyed as it is not overwritten. However, since this type of method requires a plurality of nonvolatile memories, another problem of increased cost of the upgrading device may arise.

SUMMARY OF THE INVENTION

A first aspect of the present invention is directed to an upgrading device comprising: a controller; a first memory so provided as to be accessible from the controller; an intermediary, provided at an attachment part for holding a memory medium that stores information to be copied into the first memory, for connecting the memory medium and the controller when the memory medium is functionally connected to the intermediary; a cover, which is openable/closable, provided to the attachment part; and a first detector for detecting whether the cover is in open position or in closed position, wherein the controller obtains a detection result from the first detector and executes copying process of the information in the memory medium into the first memory on the basis of the detection result.

According to a second aspect of the present invention, the upgrading device according to the first aspect further comprises a second memory for providing a work area for the controller, wherein, when the memory medium is functionally connected to the intermediary, the controller loads the information in the memory medium into the second memory before executing copying process.

According to a third aspect of the present invention, in the upgrading device according to the first or second aspect, the controller executes copying process when transition of the cover from the open position to the closed position occurs.

According to a fourth aspect of the present invention, the upgrading device according to any one of the first to third aspects further comprises a second detector for detecting whether the memory medium is functionally connected or not to the intermediary, wherein, when the second detector detects that the memory medium is functionally connected to the intermediary, the controller executes copying process.

According to a fifth aspect of the present invention, the upgrading device according to any one of the first to fourth aspects further comprises a state notification part for notifying an operating state of the upgrading device.

A sixth aspect of the present invention is directed to a method of upgrading for a system comprising a semiconductor memory and a cover, which is openable/closable, provided to an attachment part for holding a memory medium that stores information to be copied into the semiconductor memory. The method comprises the steps of: (a) detecting whether the cover is in open position or in closed position; and (b) executing copying process of the information in the memory medium into the semiconductor memory on the basis of a detection result obtained at the step (a).

According to the first aspect of the present invention, the first detector detects whether the cover is in open position or in closed position and the controller executes copying process of the information in the memory medium into the first memory on the basis of the detection result obtained from the first detector. Therefore, the upgrading device according to the first aspect enables copying process to be automatically executed triggered by the detection result obtained from the detection of opening/closing movement of the cover necessarily performed during attachment of the memory medium. For this reason, by merely attaching the memory medium, a user can easily upgrade information without deep background knowledge.

According to the second aspect of the present invention, the controller loads the information in the memory medium into the second memory before executing copying process. Therefore, even when the information is not copied normally into the first memory, the information in the second memory is available to the controller. For this reason, the operations and processes of the controller may not be influenced.

According to the third aspect of the present invention, the user is only required to execute a series of simple operations (that are necessarily performed during attachment of the memory medium) of moving the cover into open position, connecting the memory medium to the intermediary and moving the cover into closed position to realize upgrading of information easily. At this time, after the cover is moved into closed position, the necessity of further push of button can be avoided.

According to the fourth aspect of the present invention, the environment allowing execution of copying process can be suitably detected. That is, when the memory medium is not correctly attached or the cover is moved between open position and closed position for withdrawing the memory medium, for example, copying process can be suspended.

According to the fifth aspect of the present invention, the user can be notified of the operating state of the upgrading device through the state notification part. Therefore, the user can be encouraged to retry operation after being notified that the memory medium is not connected correctly, for example. Further, misoperations such as withdrawal of the memory medium during copying process can be avoided. That is, the convenience of the user can be improved.

According to the sixth aspect of the present invention, copying process requiring copying of the information in the memory medium into the semiconductor memory is executed on the basis of the detection result of whether the cover is in open position or in closed position. Therefore, the foregoing copying process can be automatically executed triggered by the detection result obtained from the detection of opening/closing movement of the cover necessarily performed during attachment of the memory medium. For this reason, by merely attaching the memory medium, the user can easily upgrade information without deep background knowledge.

It is an object of the present invention to provide an upgrading device and a method of upgrading capable of upgrading information in a memory without requiring a user to have deep background knowledge.

These and other objects, features, aspects and advantages of the present invention will become more apparent from the following detailed description of the present invention when taken in conjunction with the accompanying drawings.

DESCRIPTION OF THE PREFERRED EMBODIMENTS

<First Preferred Embodiment>

Figure 1:
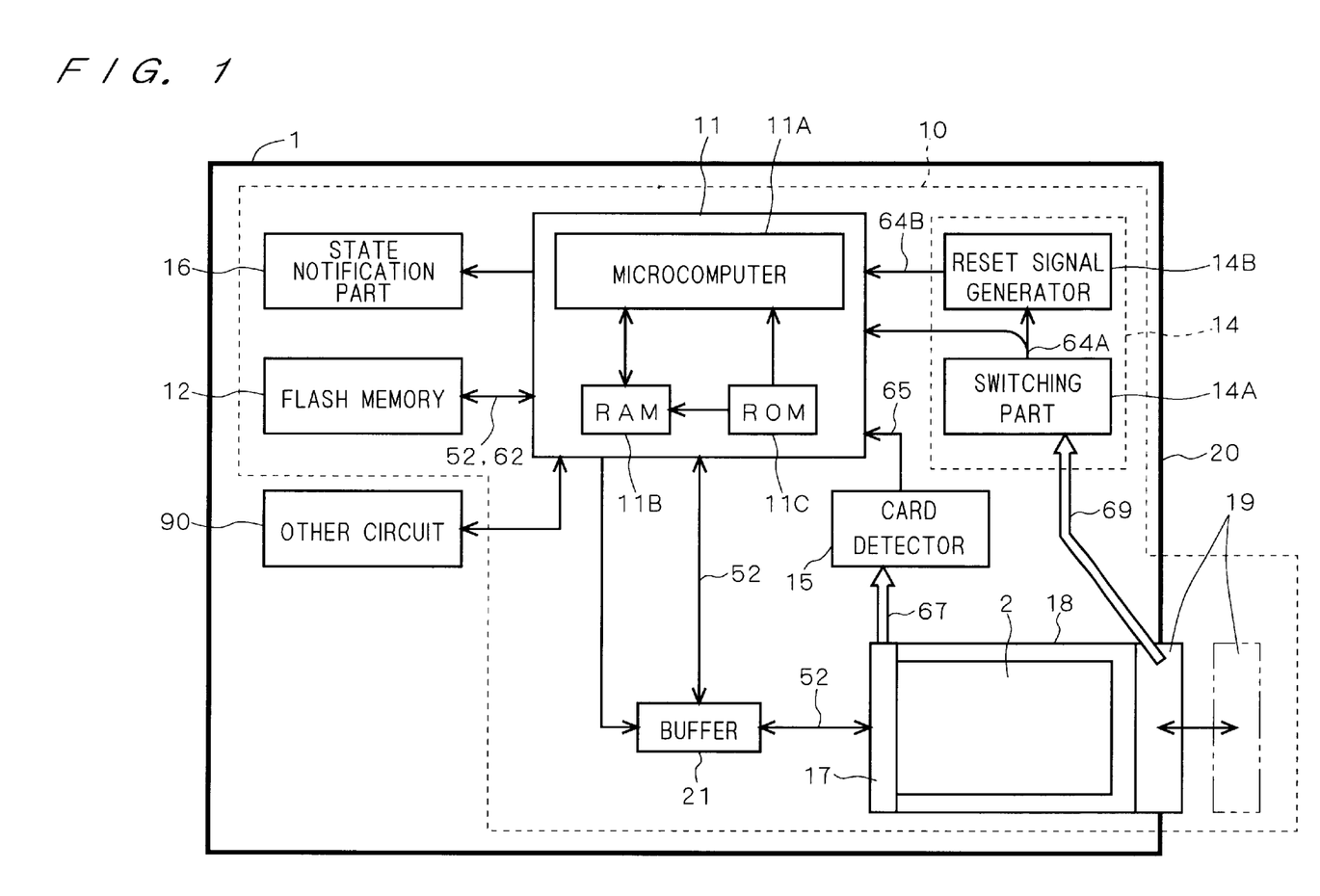
FIG. 1 is a schematic view showing a structure of an upgrading part according to a first preferred embodiment of the present invention.

FIG. 1 is a schematic view showing a structure of a television receiver (or system) 1 according to the first preferred embodiment. An upgrading device 10 according to the first preferred embodiment will be described in reference to FIG. 1. The television receiver may also be called simply as "receiver" hereinafter. As shown in FIG. 1, the receiver 1 includes a case 20, the upgrading part (or upgrading device) 10 and other circuit 90. For convenience of description, a memory card (or memory medium) 2 which will be described later is also shown in FIG. 1.

Among components of the receiver 1, the other circuit 90 consists of components other than those of the upgrading part 10. For example, the circuit 90 may include a circuit for receiving a signal (regardless of whether it is wire or wireless) for television broadcasting to perform display of image and sound reproduction on the basis of the received signal.

The upgrading part 10 comprises a controller 11, a flash memory (or first memory) 12, a card insertion part (or attachment part) 18, a connector (or intermediary) 17, a buffer 21, a card detector (or second detector) 15, a cover 19, a detector 14 (or first detector) for detecting opening/closing of cover and a state notification part 16.

More particularly, the controller 11 includes (namely, the upgrading part 10 includes) a microcomputer 11A, a RAM (random access memory) (or second memory) 11B and a ROM (read only memory) 11C. The RAM 11B and ROM 11C are so provided as to be accessible from the microcomputer 11A. The RAM 11B stores various types of software (including program) and data (that may also be respectively called as "information" hereinafter) or the like to provide a work area during execution of a program. The ROM 11C stores program and data in advance to be executed by the microcomputer 11A. The information stored in the ROM 11C can be transferred to the RAM 11B. The upgrading part 10 and the other circuit 90 are controlled in various manners by the controller 11 having such structure. Details of control of the upgrading part 10 by the controller 11 will be described later.

The flash memory 12 is so provided as to be accessible from the controller 11. Similar to the ROM 11C, the flash memory 12 stores information such as program and data to be executed by the controller 11. In the flash memory 12, (a) dissimilar to the RAM 11B, information is stored in a non-volatile manner, and (b) dissimilar to the ROM 11C, stored information is rewritable. In view of these characteristics, semiconductor memories such as EPROM (erasable and programmable ROM) and EEPROM (electrically erasable and programmable ROM), or alternatively, memory devices such as hard disk, can be used instead of the flash memory 12.

The information in the flash memory 12 and ROM 11C are loaded (or read) into the RAM 11B and then executed or used by the microcomputer 11A. Generally, while information is stored in the flash memory 12 and memory card 2 in a compressed style, it is stored in the RAM 11B in a style allowing use by the microcomputer 11A (or in a decompressed style). For this reason, "load of information into the RAM 11B" means "store of information into the RAM 11B in a style allowing use by the microcomputer 11A".

Information 62 in the flash memory 12 can be rewritten using the memory card 2. That is, information 52 for upgrading the information 62 in the flash memory 12 is previously stored in the memory card 2. More particularly, the information 52 in the memory card 2 includes main program for various operations of the receiver 1 (such as signal processing for television broadcasting, display of image and sound reproduction, that may also be called as "normal operations" hereinafter), program for upgrading (that may also be called as "upgrading program" hereinafter) and version information of these programs. As a copy of the information 52 stored in the memory card 2 is made into the flash memory 12 as described below, the information 62 in the flash memory 12 as well as the information 52 is to include main program, upgrading program and version information.

The upgrading part 10 includes the card insertion part 18 as the attachment part or holding space for the memory card 2. A space extending from an outer surface to the inside of the case 20 is provided to the receiver 1 as the card insertion part 18.

The connector 17 for the memory card 2 is provided to the card insertion part 18, or more particularly, to the inside of the case 20. The memory card 2 is inserted into the connector 17 to establish functional connection therebetween. That is, terminals 2A of the memory card 2 (see FIG. 2 described later) and terminals 17A of the connector 17 (see FIG. 2 described later) are electrically connected by insertion of the memory card 2. At this time, the terminals 17A of the connector 17 are connected to the controller 11 through the buffer 21. Therefore, the controller 11 can access to the memory card 2 through the buffer 21 and the connector 17 by the electrical connection (or functional connection) established between the connector 17 and memory card 2.

The buffer 21 is made controllable by the controller 11. As the upgrading part 10 includes the buffer 21, hot plug of the memory card 2 can be performed.

The card detector 15 detects mechanically, electrically or optically, for example, whether the memory card 2 is electrically (or functionally) connected or not to the connector 17. This detection is schematically shown by an arrow 67 in FIG. 1. The card detector 15 outputs (or continues to output) a detection result 65 to the controller 11.

Figure 2:
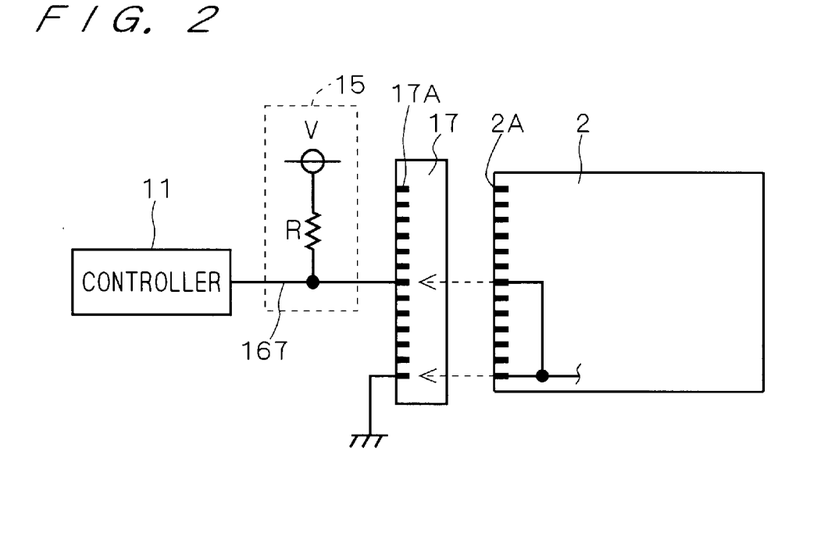
FIG. 2 is a schematic view showing an example of a detailed structure of a card detector according to the first preferred embodiment of the present invention.

FIG. 2 is a schematic view showing an example of a detailed structure of the card detector 15. As shown in FIG. 2, the card detector 15 can be structured by a power supply V and a resistor R. More particularly, one terminal 17A among a plurality of terminals 17A of the connector 17 and the controller 11 are connected by a wiring 167 that is coupled with the power supply V through the resistor R. Due to this connection, the wiring 167 is pulled up to an output potential of the power supply V when the memory card 2 is not connected. Further, another terminal 17A of the connector 17 is grounded. At this time, two terminals 2A of the memory card 2 that are respectively corresponding to the two terminals 17A as mentioned above are directly connected in the memory card 2.

When the memory card 2 is connected to the connector 17, the wiring 167 pulled up to the potential of the power supply V becomes a ground potential accordingly. It can be detected whether the memory card 2 is connected or not to the connector 17 on the basis of the potential difference of the wiring 167. That is, the potential of the wiring 167 is corresponding to the detection result 65 from the card detector 15.

Returning to FIG. 1, the cover 19 so provided as to be engageable with the case 20, covers the card insertion part 18 having an opening at the case 20. In FIG. 1, the cover 19 is shown by solid lines when attached to and covering the opening of the card insertion part 18 (that may also be called as "in closed position" hereinafter). On the other hand, the cover 19 is shown by two-dot chain lines when detached from the opening (that may also be called as "in open position" hereinafter). As shown in FIG. 1, the cover 19 is completely detachable from the case 20 when in open position.

The detector 14 for detecting opening/closing of cover so provided as to be operatively associated with the cover 19 detects whether the cover 19 is in open position or in closed position and outputs a detection result thereof or the like to the controller 11. This detection is schematically shown by an arrow 69 in FIG. 1. The detector 14 for detecting opening/closing of cover includes a switching part 14A and a reset signal generator 14B.

The switching part 14A detects mechanically, electrically or optically, for example, whether the cover 19 is in open position or in closed position and outputs a detection result 64A thereof to the controller 11 and the reset signal generator 14B. That is, the switching part 14A is operatively associated with the opening/closing movement of the cover 19 to output (or continue to output) the detection result 64A showing whether the cover 19 is in open position or in closed position.

Figure 3:
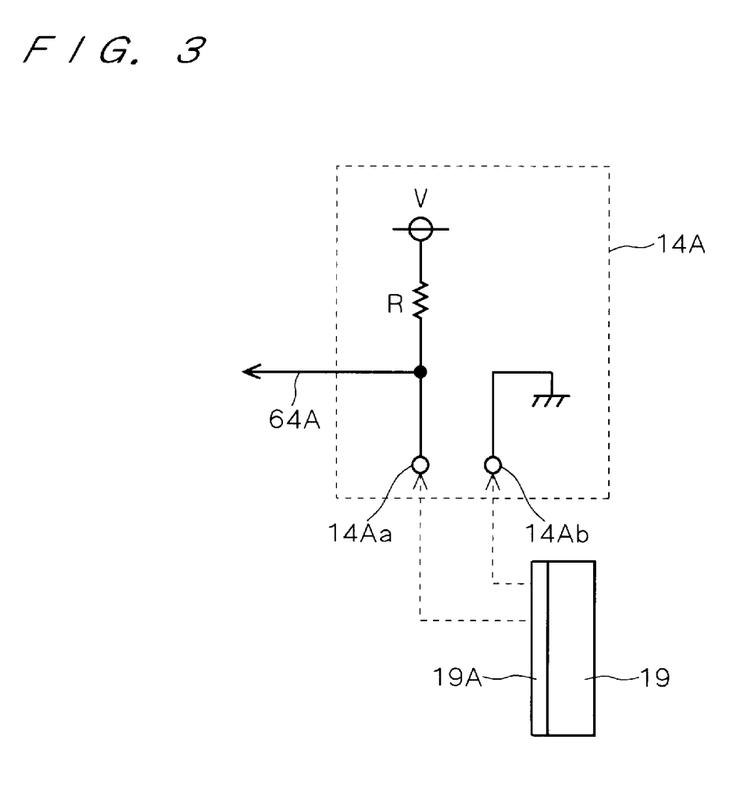
FIG. 3 is a schematic view showing an example of a detailed structure of a switching part according to the first preferred embodiment of the present invention.

FIG. 3 is a schematic view showing an example of a detailed structure of the switching part 14A. As shown in FIG. 3, the switching part 14A can be structured by the same members as used in the card detector 15, for example.

More particularly, the switching part 14A includes two terminals 14A$a$ and 14A$b$. While the terminal 14A$a$ is connected to a power supply V through a resistor R, the terminal 14A$b$ is grounded. On the other hand, a conductor 19A such as a metal is provided to the cover 19. The terminals 14A$a$, 14A$b$ and the conductor 19A are arranged in such a way that the terminals 14A$a$, 14A$b$ and the conductor 19A are in contact with each other, namely, the terminals 14A$a$ and 14A$b$ are made conductive through the conductor 19A when the cover 19 is in closed position.

According to this arrangement, the terminal 14A$a$ is pulled up to an output potential of the power supply V when the cover 19 is in open position. When the cover 19 is in closed position, on the other hand, the terminal 14A$a$ becomes a ground potential. Therefore, it can be detected whether the cover 19 is in open position or in closed position on the basis of the potential of the terminal 14A$a$. That is, the potential of the terminal 14A$a$ is corresponding to the detection result 64A from the switching part 14A.

The reset signal generator 14B receives the detection result 64A and detects transition of the cover 19 from open position to closed position. Thereafter the reset signal generator 14B outputs (or continues to output) a detection result 64B (which may also be called as "reset signal" hereinafter) showing occurrence of this transition to the controller 11.

The state notification part 16 notifies a user of the operating state of the upgrading part 10. For example, the user is notified that a copy of the information 52 in the memory card 2 is being made into the flash memory 12 which will be described later. As the state notification part 16, a single light emitting diode such as an LED (light emitting diode) can be applicable, for example. In this case, the user is visually notified of the above operating state on the basis of whether the light emitting element is lighting or unlighted. Alternatively, various types of display devices such as a liquid crystal display and an LED display are applicable further as the state notification part 16. In this case, the user is notified of the above operating state by characters, pictures or the like. Instead of or in addition to such visual notification, the state notification part 16 can be an element allowing auditory notification of the above operating state by voice, sound of bell or the like. The state notification part 16 includes a driving circuit and a control circuit (not shown) of the element such as the display device as mentioned above and is controlled by the controller 11. Further, the state notification part 16 displays not only the operating state of the upgrading part 10 but also that of the receiver 1 as a whole.

Figure 4:
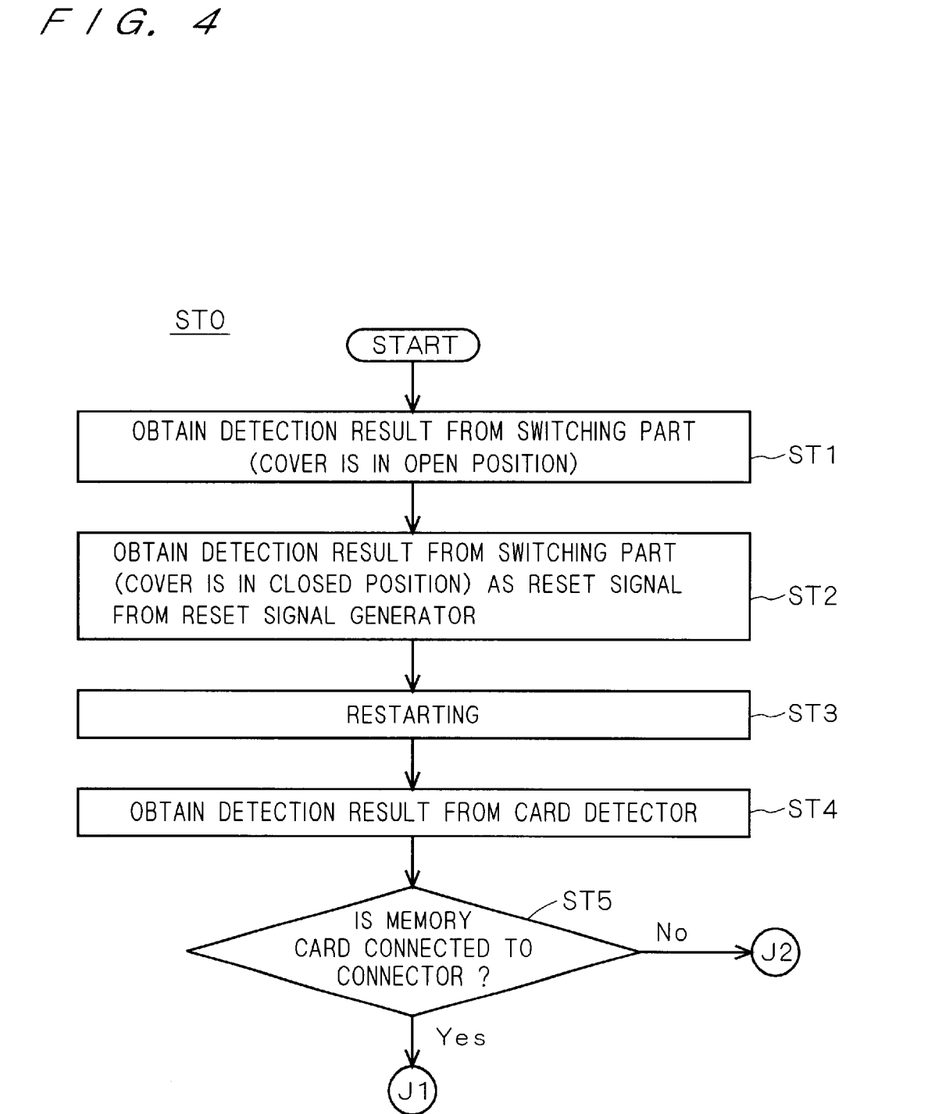
FIGS. 4 and 5 are flow charts showing operations of the upgrading part according to the first preferred embodiment of the present invention.
Figure 5:
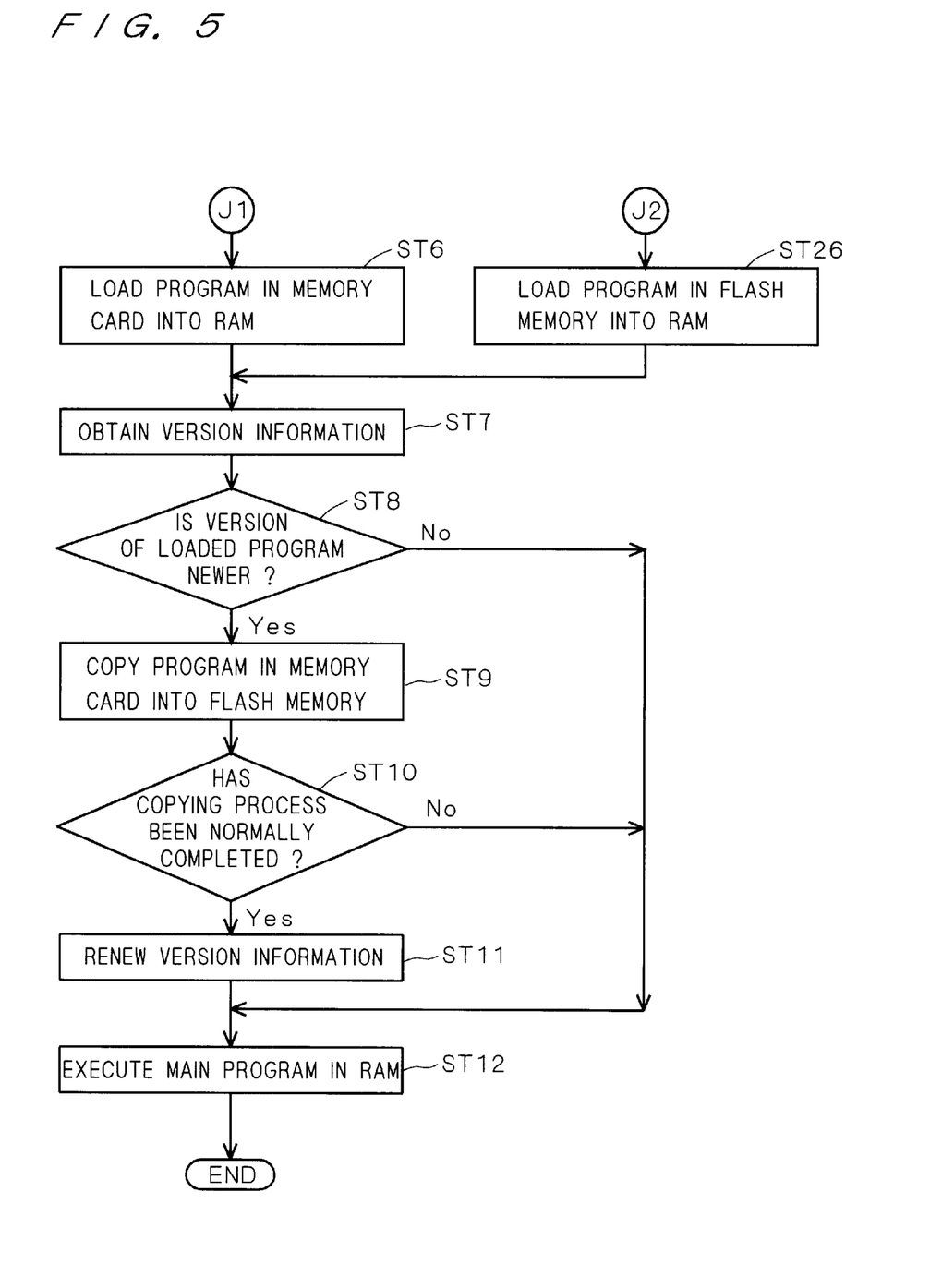

Next, operation or process of the upgrading part 10 will be described in reference to the flow charts of FIGS. 4 and 5. FIGS. 4 and 5 are connected by connectors J1 and J2. Further, FIGS. 4 and 5 mainly show the operation or process ST0 of the controller 11. The controller 11 executes steps ST1 through ST6 and ST26 according to the program in the ROM 11C and executes steps ST7 through ST12 according to the program in the memory card 2 or in the flash memory 12. A power supply of the receiver 1 or the upgrading part 10 is turned on previously.

When the user opens the cover 19, the switching part 14A detects that the cover 19 is in open position and transmits the detection result 64A thereof to the controller 11 and the reset signal generator 14B. The controller 11 obtains the detection result 64A (step ST1) and controls the buffer 21 not to be operative. The reset signal generator 14B is not induced to output the reset signal 64B by merely receiving the detection signal 64A showing that the cover 19 is in open position.

The user inserts the memory card 2 into the card insertion part 18 to be attached to the connector 17. Alternatively, the memory card 2 already attached is withdrawn. The card detector 15 detects whether the memory card 2 is functionally connected or not to the connector 17 to output (continue to output) the detection result 65 thereof to the controller 11.

When the user closes the cover 19 thereafter, the switching part 14A detects that the cover 19 is in closed position to transmit the detection result 64A thereof to the reset signal generator 14B. On receipt of this detection result 64A and the detection result 64A previously received, the reset signal generator 14B detects the transition of the cover 19 from open position to closed position to output the detection result (or reset signal) 64B thereof to the controller 11. That is, the controller 11 obtains information on the transition of the cover 19 from open position to closed position as the reset signal 64B (step ST2). After receipt of the reset signal 64B, the controller 11 restarts the receiver 1 (or upgrading part 10) (step ST3).

After restarting, the controller 11 obtains the above detection result 65 from the card detector 15 (step ST4) and decides whether the memory card 2 is functionally connected or not to the connector 17 on the basis of the detection result 65 (step ST5).

When the memory card 2 is decided to be connected to the connector 17 as a result of step ST5, the controller 11 executes step ST6. Namely, the controller 11 loads the information 52 in the memory card 2 (more particularly, main program, upgrading program and version information) into the RAM 11B at step ST6. When the memory card 2 is decided not to be connected to the connector 17, on the other hand, the controller 11 loads the information 62 in the flash memory 12 (more particularly, main program, upgrading program and version information) into the RAM 11B at step ST26. The controller 11 proceeds to step ST7 after execution of either step ST6 or step ST26.

The controller 11 executes the following steps ST7 through ST11 according to the loaded upgrading program. First, the controller 11 obtains version information on each of the main program loaded into the RAM 11B and the main program in the flash memory 12 (step ST7) and compares version information on each programs (step ST8).

When the version of the loaded main program is decided to be newer than that of the main program in the flash memory 12 at step ST8, the controller 11 erases the information in the flash memory 12 and copy the main program and upgrading program in the memory card 2 into the flash memory 12 (step ST9). Alternatively, the information in the flash memory 12 is overwritten.

When the version of the loaded main program is decided to be the same as or older than that of the main program already stored in the flash memory 12, on the other hand, the controller 11 proceeds to step ST12 that will be described later. When the program in the flash memory 12 is loaded into the RAM 11B by executing step ST26, the main program stored in the RAM 11B is the same as that in the flash memory 12 during execution of steps ST7 and ST8. The version information is the same between these programs accordingly. For this reason, when step ST26 is executed, the controller 11 proceeds from step ST8 to step ST12.

In making a copy, there may be some possibility of an error in the stored information resulted from the causes such as foreign noises. Due to this, after making a copy, the controller 11 checks (or verifies) whether the program is stored normally or not in the flash memory 12 (step ST10). More particularly, the error is detected by means of checksum and CRC (cyclic redundancy check), for example.

When the controller 11 decides that a copy has been made normally at step ST10, the version information of the copied program (namely, the program in the memory card 2) is written into the flash memory 12. The version information in the flash memory 12 is thereby renewed (step ST11). By executing copying process at steps ST9 and ST11, all the information 52 in the memory card 2 is copied into the flash memory 12.

The controller 11 thereafter executes the main program stored in the RAM 11B to perform normal operations (step ST12).

When the controller 11 decides that a copy has not been made normally at step ST10, it proceeds to step ST12 without executing renewal of version (step ST11).

When the receiver 1 is powered on again after powering off following use of the same (step ST3), the controller 11 executes steps ST4 through ST12.

Though not shown in the flowcharts of FIGS. 4 and 5, the user is notified of the operating state of the upgrading part 10 by the state notification part 16 that is under control of the controller 11 during process ST0. When the controller 11 decides that the memory card 2 is connected to the connector 17 at step ST5, for example, the controller 11 controls the state notification part 16 to turn the LED on. Further, the controller 11 turns the LED off at the beginning of step ST12. As the user can be thereby notified of the execution state of process ST0 through the state notification part 16, misoperations such as withdrawal of the memory card 2 during process ST0 can be avoided. Further, the state notification part 16 notifies the user that a memory medium is not connected correctly, for example, so that the user can be encouraged to retry operation. The convenience of the user can be improved accordingly by the state notification part 16.

As described above, the upgrading part 10 includes the cover 19, the detector 14 for detecting opening/closing of cover and the controller 11 for executing copying process at steps ST9 and ST11 on the basis of the detection results 64A and 64B from the detector 14 for detecting opening/closing of cover. Therefore, the upgrading part 10 or its operations enable the foregoing copying process at steps ST9 and ST11 to be automatically executed triggered by the detection results 64A and 64B that are obtained from the detection of opening/closing movement of the cover 19 necessarily performed during attachment of the memory card 2.

More particularly, the detector 14 for detecting opening/closing of cover detects whether the cover 19 is in open position and in closed position (or specifically, it detects transition of the cover 19 from open position to closed position) to execute or start process ST0 for executing copying process at steps ST9 and ST11 on the basis of the detection results 64A and 64B obtained therefrom.

Therefore, the user is only required to execute a series of simple operations (that are necessarily performed during attachment of the memory card 2) of moving the cover 19 into open position, functionally connecting the memory card 2 to the connector 17 and moving the cover 19 into closed position. For this reason, by merely attaching the memory card 2, the user can easily upgrade the information 62 in the flash memory 12 without deep background knowledge. At this time, the upgrading part 10 does not require operation such as further push of button after the cover 19 is moved in closed position.

The card detector 15 detects whether the memory card 2 is functionally connected to the connector 17 or not. Therefore, in the case when the memory card 2 is not correctly connected or when the cover 19 is moved between open position and closed position for withdrawing the memory card 2, for example, it is possible to suspend copying process at steps ST9 and ST11. That is, the environment allowing execution of copying process at steps ST9 and ST11 can be suitably detected by the upgrading part 10.

Prior to copying process at steps ST9 and ST11, the program in the memory card 2 is loaded into the RAM 11B at step ST6 by the controller 11. Therefore, even when a copy of the program is not made normally into the flash memory 12, the program loaded into the RAM 11B is available to the controller 11. The controller 11 can be operative and capable of following process accordingly.

The description is given taking a television receiver as an example in this preferred embodiment. It is as a matter of course that the upgrading part 10 is applicable to various types of systems in which the program to be executed by the controller 11 is upgradable.

Instead of the memory card 2, a stick-like memory medium and the like is applicable. In other words, a shape of a memory medium for storing information that is to be copied into the flash memory is not limited to a card-like shape. In addition, a memory medium of non-contact type is also applicable as the memory card 2 (or its equivalent). In this case, a reader for the non-contact type memory medium is provided (as an intermediary) as a substitute for the connector 17. The non-contact type memory medium is made accessible from the controller 11 by connecting the non-contact type memory medium and the reader functionally or in a manner allowing sending and receipt of information therebetween. Even when the non-contact type memory medium is used, the card detector 15 is capable of detecting the same mechanically or electrically, for example.

The above description is directed to the case in which the information 52 and 62 in the memory card 2 and the flash memory 12 include programs. The above description is further applicable to the case in which the information 52 and 62 include various types of software, data and the like used by the controller 11 and a copy of the same is made from the memory card 2 into the flash memory 12.

<First Modification of First Preferred Embodiment>

Figure 6:
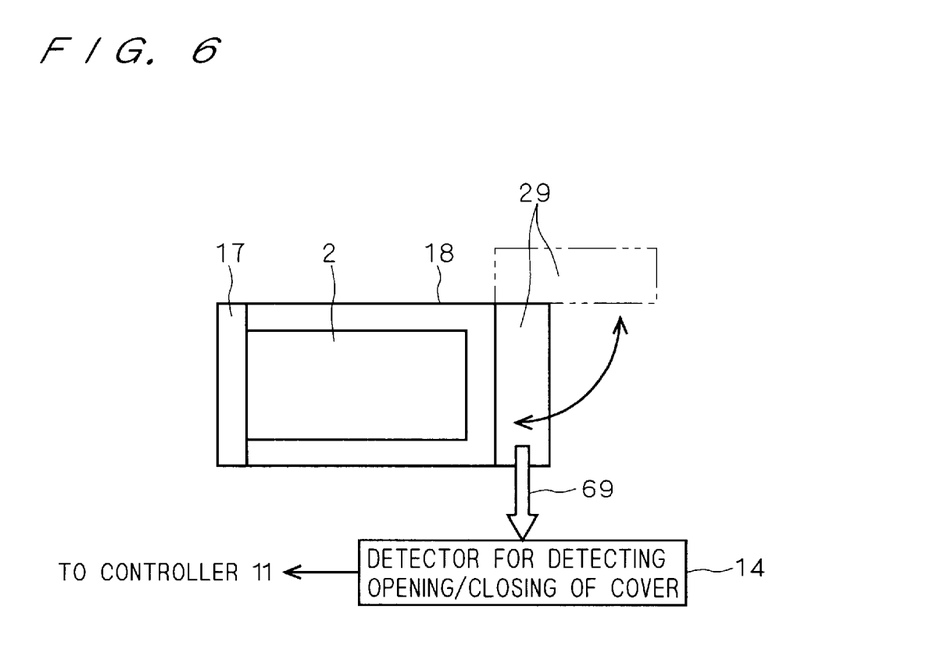
FIG. 6 is a schematic view explaining a structure of an upgrading part according to a first modification of the first preferred embodiment of the present invention.

FIG. 6 is a schematic view explaining a structure of an upgrading part according to a first modification of the first preferred embodiment. The same reference numbers are assigned to the components corresponding to those in the first preferred embodiment already described whose detailed description is also applicable here. As shown in FIG. 6, a cover 29 according to the first modification is so provided as to cover the opening of the card insertion part 18 and attached at a periphery of this opening by a hinge or the like (not shown). The detector 14 for detecting opening/closing of cover is so provided as to be operatively associated with the cover 29. Similar to the cover 19, it is detected by the detector 14 whether the cover 29 is in open position or in closed position. The above-mentioned effect can be produced as well by the upgrading part having the cover 29. It is a matter of course, further, that a sliding cover is also applicable.

Figure 7:
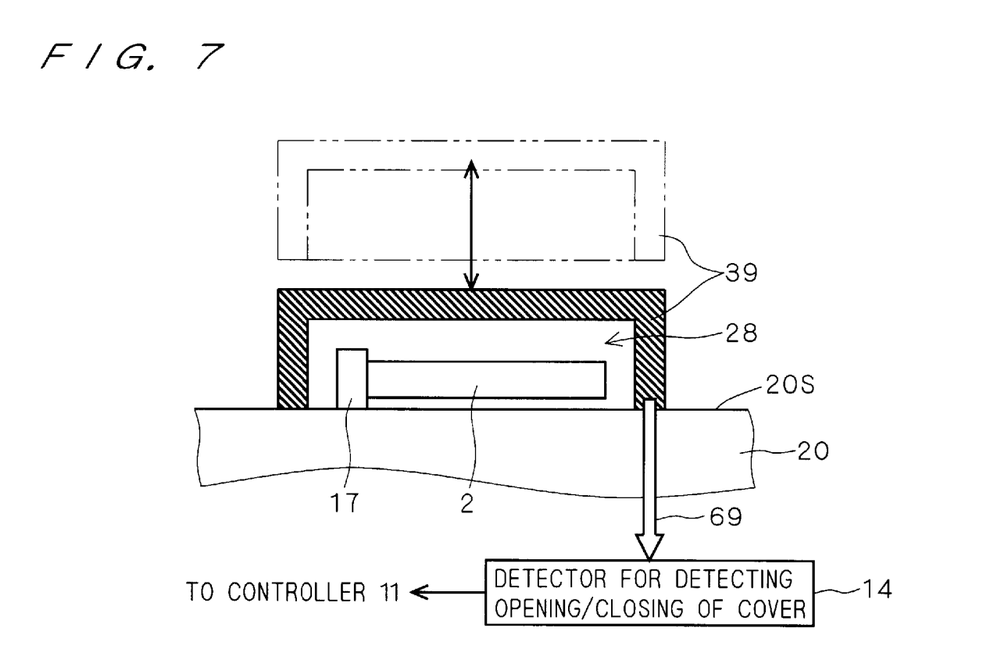
FIG. 7 is a schematic view explaining another structure of the upgrading part according to the first modification of the first preferred embodiment of the present invention.

FIG. 7 is a schematic view explaining another structure of the upgrading part according to the first modification. As shown in FIG. 7, the connector 17 can be so provided as to protrude from an outer surface 20S of the case 20 to the outside of the same. In this case, a holding space for the memory card 2 at a periphery of the outer surface 20S can be named as an attachment part 28 corresponding to the attachment 18 in FIG. 1.

In response to this formation of the connector 17 and the attachment part 28, the cover 39 according to the first modification has a vessel-like shape to be capable of covering the connector 17 and the memory card 2 connected to the connector 17. Further, a pawl (not shown) is provided to an edge of an opening of the cover 39 and a hole (not shown) is provided to the case 20. The cover 39 is attached to the case 20 (or upgrading part) (namely the cover 39 is moved into closed position) by engaging these pawl and hole with each other. The cover 39 can be made of a U-shaped member, for example. Similar to the cover 29 (see FIG. 6), further, it can be attached to the case 20 by a hinge or the like (not shown) in a manner allowing opening/closing movement of the cover 39. The detector 14 for detecting opening/closing of cover is so provided as to be operatively associated with the cover 39. Similar to the cover 19, it is detected by the detector 14 whether the cover 39 is in open position or in closed position. The above-mentioned effect can be produced as well by the upgrading part having the cover 39.

The other components of the (two) upgrading parts are the same as those of the upgrading part 10 as described above (see FIG. 1).

<Second Modification of First Preferred Embodiment>

Figure 8:
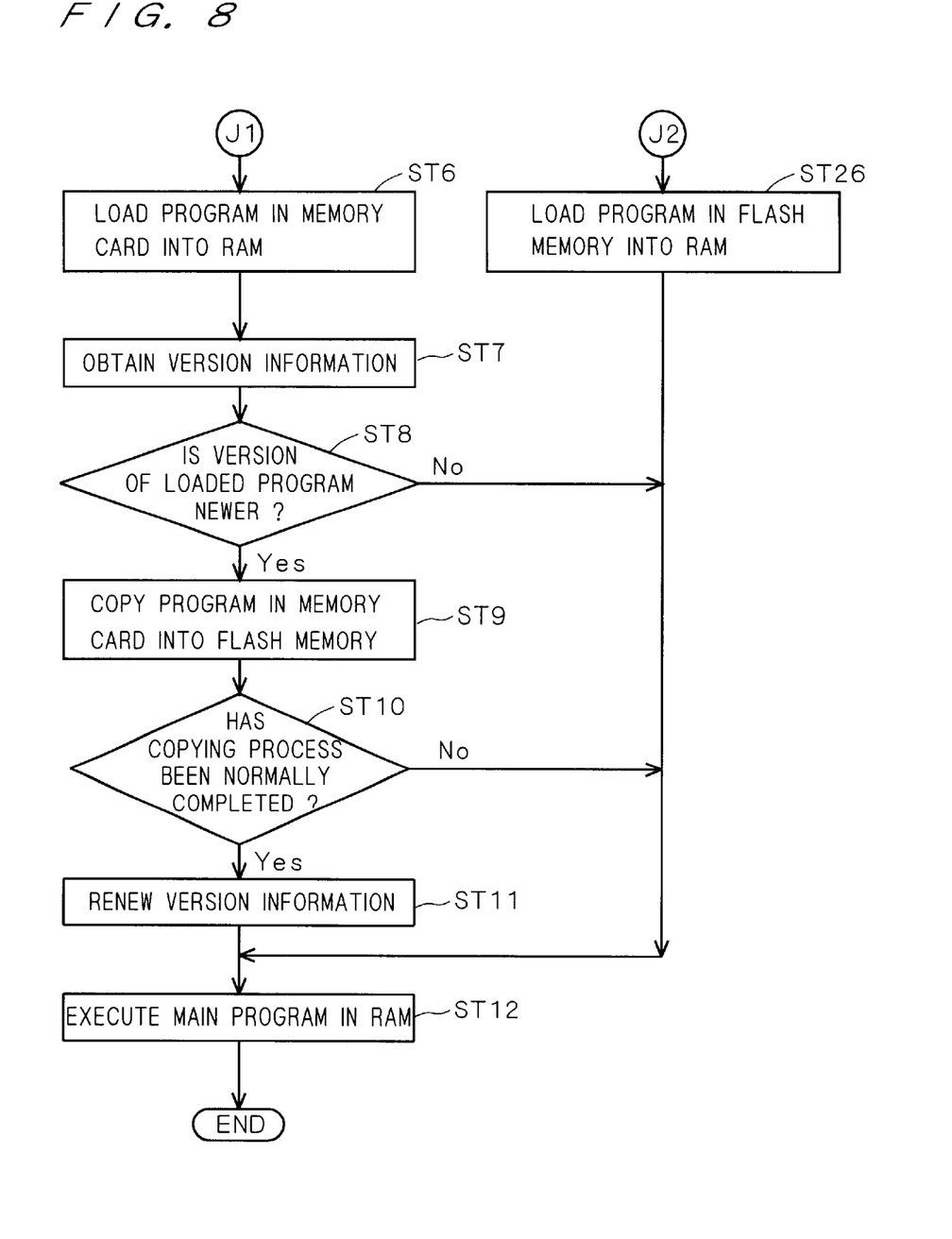
FIG. 8 is a flow chart showing operations of an upgrading part according to a second modification of the first preferred embodiment of the present invention.

FIG. 8 is a flow chart showing operations of an upgrading part according to a second modification of the first preferred embodiment. FIG. 8 is corresponding to FIG. 5 described above and is connected with FIG. 4 described above by the connectors J1 and J2.

As already mentioned, when step ST26 is executed in process ST0 (see FIGS. 4 and 5), the main programs having the same version are stored in the RAM 11B and the flash memory 12 during execution of steps ST7 and ST8. For this reason, the process proceeds from step ST8 to step ST12 after execution of step ST26.

In view of this regard, the process is allowed to proceed to step ST12 directly after step ST26. Such flow of process is realizable by the following, for example. That is, the program or upgrading program in the ROM 11C is changed so that the decision result obtained at step ST5 can be reflected after execution of step ST6 or step ST26.

<Third Modification of First Preferred Embodiment>

Instead of executing step ST2 already mentioned (see FIG. 4), the controller 11 may execute the following step. That is, the controller 11 obtains all the detection result 64A outputted from the switching part 14A so that the controller 11 detects (or decides) transition of the cover 19 from open position to closed position instead of the reset signal generator 14B. Namely, the reset signal generator 14B can be replaced by the controller 11 for execution of the process of the same. In this case, there is no necessity of providing the resent signal generating pat 14B so that the structure of the upgrading part 10 excluding the same can be simplified.

While the invention has been shown and described in detail, the foregoing description is in all aspects illustrative and not restrictive. It is therefore understood that numerous modifications and variations can be devised without departing from the scope of the invention.

What is claimed is:

1. An upgrading device comprising:

a controller;

a first memory so provided as to be accessible from said controller;

an intermediary, provided at an attachment part for holding a memory medium that stores information to be copied into said first memory, for connecting said memory medium and said controller when said memory medium is functionally connected to said intermediary;

a cover, which is openable/closable, provided to said attachment part; and a first detector for detecting whether said cover is in open position or in closed position, wherein said controller obtains a detection result from said first detector and executes copying process of said information in said memory medium into said first memory on the basis of said detection result.

2. The upgrading device according to claim 1, further comprising a second memory for providing a work area for said controller, wherein, when said memory medium is functionally connected to said intermediary, said controller loads said information in said memory medium into said second memory before executing said copying process.

3. The upgrading device according to claim 1, wherein said controller executes said copying process when transition of said cover from said open position to said closed position occurs.

4. The upgrading device according to claim 1, further comprising a second detector for detection whether said memory medium is functionally connected to said intermediary or not, wherein, when said second detector detects that said memory medium is functionally connected to said intermediary, said controller executes said copying process.

5. The upgrading device according to claim 1, further comprising a state notification part for notifying an operating state of said upgrading device.

6. A method of upgrading for a system, said system comprising a semiconductor memory and a cover, which is openable/closable, provided to an attachment part for holding a memory medium that stores information to be copied into said semiconductor memory, said method comprising the steps of:

(a) detecting whether said cover is in open position or in closed position; and (b) executing copying process of said information in said memory medium into said semiconductor memory on the basis of a detection result obtained at said step (a).

* * * * *